United States Patent
Wodtke

(10) Patent No.: US 7,225,699 B2
(45) Date of Patent: Jun. 5, 2007

(54) GEAR DRIVE MECHANISM WITH ANTI-RATTLE DEVICE

(75) Inventor: Hans-Walter Wodtke, Werdohl (DE)

(73) Assignee: Aft Atlas Fahrzeugtechnik GmbH, Werdohl (DE)

( * ) Notice: Subject to any disclaimer, the term of this patent is extended or adjusted under 35 U.S.C. 154(b) by 406 days.

(21) Appl. No.: 10/607,076

(22) Filed: Jun. 25, 2003

(65) Prior Publication Data

US 2004/0053740 A1    Mar. 18, 2004

(30) Foreign Application Priority Data

Jun. 27, 2002    (DE)    ............... 102 280 706

(51) Int. Cl.
*F16H 55/14*    (2006.01)

(52) U.S. Cl. .................................................. 74/443

(58) Field of Classification Search .............. 74/409, 74/440, 443
See application file for complete search history.

(56) References Cited

U.S. PATENT DOCUMENTS

| | | | | |
|---|---|---|---|---|
| 2,800,800 A | * | 7/1957 | Dunn | ............. 74/325 |
| 3,548,673 A | * | 12/1970 | Suchocki | ............. 74/409 |
| 3,638,511 A | * | 2/1972 | Kirschner | ............. 74/440 |
| 3,861,231 A | * | 1/1975 | F'Geppert | ............. 74/410 |
| 4,519,264 A | * | 5/1985 | Inui | ............. 74/409 |
| 4,884,959 A | * | 12/1989 | Ito et al. | ............. 425/84 |
| 5,257,543 A | | 11/1993 | Fogelberg | |
| 6,832,661 B2 | * | 12/2004 | Palfenier et al. | ............. 180/444 |
| 6,997,076 B2 | * | 2/2006 | Menjak et al. | ............. 74/409 |

FOREIGN PATENT DOCUMENTS

| | | |
|---|---|---|
| DE | 44 26 325 A1 | 3/1995 |
| EP | 1 180 617 A1 | 2/2002 |
| GB | 2 125 927 A1 | 3/1984 |
| JP | 57-110866 A1 | 7/1982 |
| JP | 60-157561 A1 | 8/1985 |
| JP | 02173457 A * | 7/1990 |

OTHER PUBLICATIONS

French Search Report for corresponding French Application No. FR 0307791, dated Dec. 5, 2005.

* cited by examiner

*Primary Examiner*—Vicky A. Johnson
(74) *Attorney, Agent, or Firm*—Darby & Darby

(57) ABSTRACT

A gear drive mechanism with two rotary gears meshing with each other has a first friction rim surface rotationally coupled to one of the two gears and a second friction rim surface rotationally coupled to the other of the two gears. The friction rim surfaces are in mutual contact with each other and thereby enabled to transmit a friction-based torque between each other.

13 Claims, 2 Drawing Sheets

GEAR DRIVE MECHANISM WITH ANTI-RATTLE DEVICE

BACKGROUND OF THE INVENTION

The invention relates to a gear drive mechanism with an anti-rattle device. Rattling or clattering noises which are found irritating occur often in gear mechanisms as a result of non-uniformities in the movement of the shafts that are rotationally coupled to the gears and as a result of the play between the tooth flanks of the gears.

OBJECT AND SUMMARY OF THE INVENTION

The objective of the present invention is to provide a gear drive mechanism that is free of rattling and clattering noises of the aforementioned kind.

To solve this problem, the invention proposes a gear drive mechanism with an anti-rattle device. The mechanism has a first gear (6) rotatable about a first axis and a second gear (8) rotatable about a second axis. The first and second axes run at a predetermined distance from each other, and the first and second gears are in meshing engagement with each other. A first friction rim surface (16) is rotationally coupled to the first gear, and a second friction rim surface (18) is rotationally coupled to the second gear. The friction surfaces (16) and (18) are in contact with each other, so that a torque is transmitted through the rolling friction.

In an advantageous embodiment of the gear drive mechanism according to the invention, at least one of the friction rim surfaces is formed on the rim of a friction wheel that is attached to one side of one of the gears, positioned coaxially with the respective gear.

With preference, the friction rim surfaces are conically slanted, with the middle radius of the frusto-conical surface being equal to the pitch-circle radius of the respective gear.

The cone angle is for example about 25°.

Preferably, one of the conical friction rim surfaces is elastically biased against the other in a direction of increasing contact pressure.

It is advantageous if the biased friction rim surface is biased in the axial direction.

In a preferred embodiment, the biased friction rim surface is formed on the outside rim of a dish-shaped plate spring.

It is advantageous if the friction rim surfaces are formed on annular discs that are arranged coaxially with the respective gears.

As a preferred feature, the friction rim surfaces are hardened.

In a further embodiment of the gear drive mechanism according to the invention, the friction rim surfaces are treated with a surface coating.

It is of practical advantage to arrange friction rim surfaces on both sides of each gear.

The invention is widely applicable for all gear pairings that have a tendency to make rattling noises due to cyclic torque loads and play in the tooth flanks. The invention is particularly well suited for applications with gear pairs in which the friction rim surfaces have tooth profiles meshing with each other.

BRIEF DESCRIPTION OF THE DRAWINGS

The invention will be discussed in further detail in connection with the attached schematic drawings, which are meant to serve as examples without limiting the scope of the invention and wherein.

DETAILED DESCRIPTION OF THE INVENTION

Figure 1:
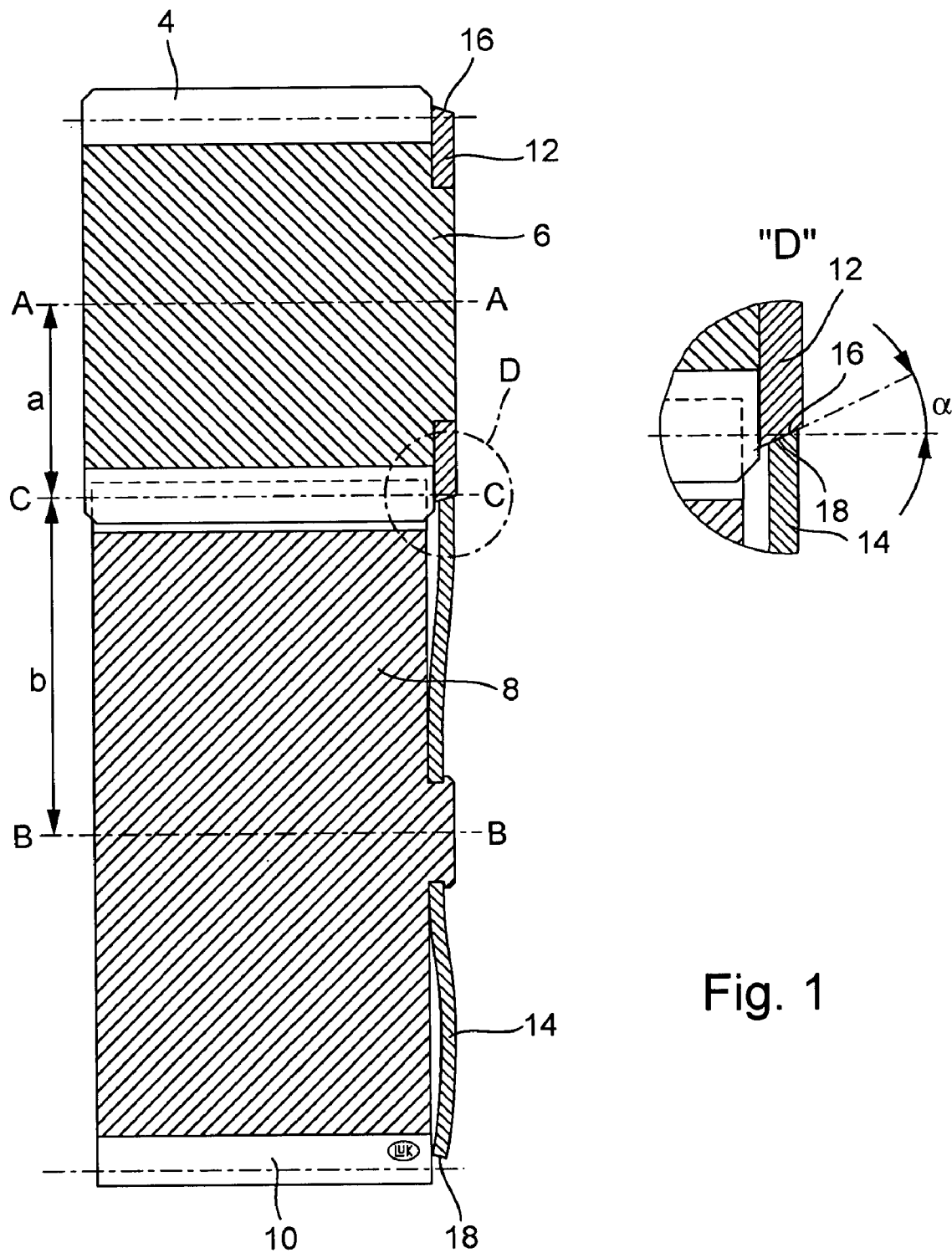
FIG. 1 represents a sectional view of a first embodiment of the gear mechanism according to the invention in a plane containing the gear axes.

In the sectional view of FIG. 1, a gear 6 carrying a tooth profile on its circumference is rotatable about an axis A—A and meshes with a second gear 8 which carries a tooth profile 10 and is rotatable about an axis B—B. The line C—C indicates the pitch line of the two tooth profiles 4 and 10; the dimension a is the pitch radius of gear 6, and b is the pitch radius of gear 8.

FIG. 1 illustrates the concept of the invention for preventing rattling noises that occur as a result of play between the tooth flanks of the gear profiles 4 and 10 and as a result of a non-uniform rotation due to torque fluctuations in the shafts (not shown in the drawings) that are rotationally coupled to the gears. According to the invention, the profile engagement between the gears 6 and 8 is paralleled by a frictional engagement between the friction wheels 12 and 14. The friction wheel 12 is rigidly connected to one side of the gear 6, centered on the axis A—A, while the friction wheel 14 is rotationally constrained to one side of the gear 8, centered on the axis B—B. The friction rim surfaces of the friction wheels 12 and 14 are rolling on each other. By design, the magnitude of the torque that can be transmitted through the rolling friction contact is at least large enough so that the torque fluctuations which are superimposed on the quasi-static torque acting between the gears 6 and 8 can be taken up and transmitted through the friction wheels.

To give a more accurate description, the friction wheel 12 is configured as a friction disc that is rotationally fixed on the gear 6, e.g. by means of a shrink-fit connection. The friction wheel 12 has a conically tapered friction surface 16 whose diameter decreases towards the side facing away from the gear 6 and whose mean diameter is equal to the pitch circle diameter of gear 6. The friction wheel 14 is configured as an annular dish-shaped spring whose radially inner portion is rotationally coupled to the side of the gear 8, e.g., by means of a shrink-fit connection and in addition by means of a keyed connection. The friction surface 18 of the annular spring disc or friction wheel 14 is tapered in the opposite sense of the friction surface 16. As shown in FIG. 1, because of the pre-tension of the annular dish-shaped spring 14, the friction surface 18 is elastically biased against the friction surface 16. At the contact location between the friction surfaces 16 and 18, the median diameter of the conical surface 18 equals the pitch circle diameter of the gear 8.

Detail D in FIG. 1 gives a magnified view of the friction rim surfaces 16 and 18 in the area of their friction-based engagement. An advantageous choice for the cone angle $\alpha$ is about 25°. The selection is based on finding a favorable compromise between the friction-force magnification effect, the accuracy requirements on a concentric and wobble-free alignment, as well as the wear reserve and the stress-load on the spring disc. In special cases, the cone angle $\alpha$ may be as much as 90°.

The conical configuration of the friction rim surfaces 16 and 18 in conjunction with the elastic bias of the friction surface 18 provides the benefits of an amplification of the friction force, a self-adjusting wear compensation, a tolerance against out-of-round errors, and a wear reserve. The conicity of the friction surfaces leads to a non-uniform rotary transmission ratio over the width of contact area, which causes a certain amount of abrasive friction. However, the effect minimizes itself during operation, because the more the radius of a given location of the friction contact differs from the nominal pitch radius of the gear pair, the stronger will be the abrasive wear at that particular location.

It is advantageous if the friction rim surfaces 16 and 18 are hardened and/or provided with a coating that is appropriately selected in accordance with the frictional torque to be transmitted and the desired durability.

Figure 2:
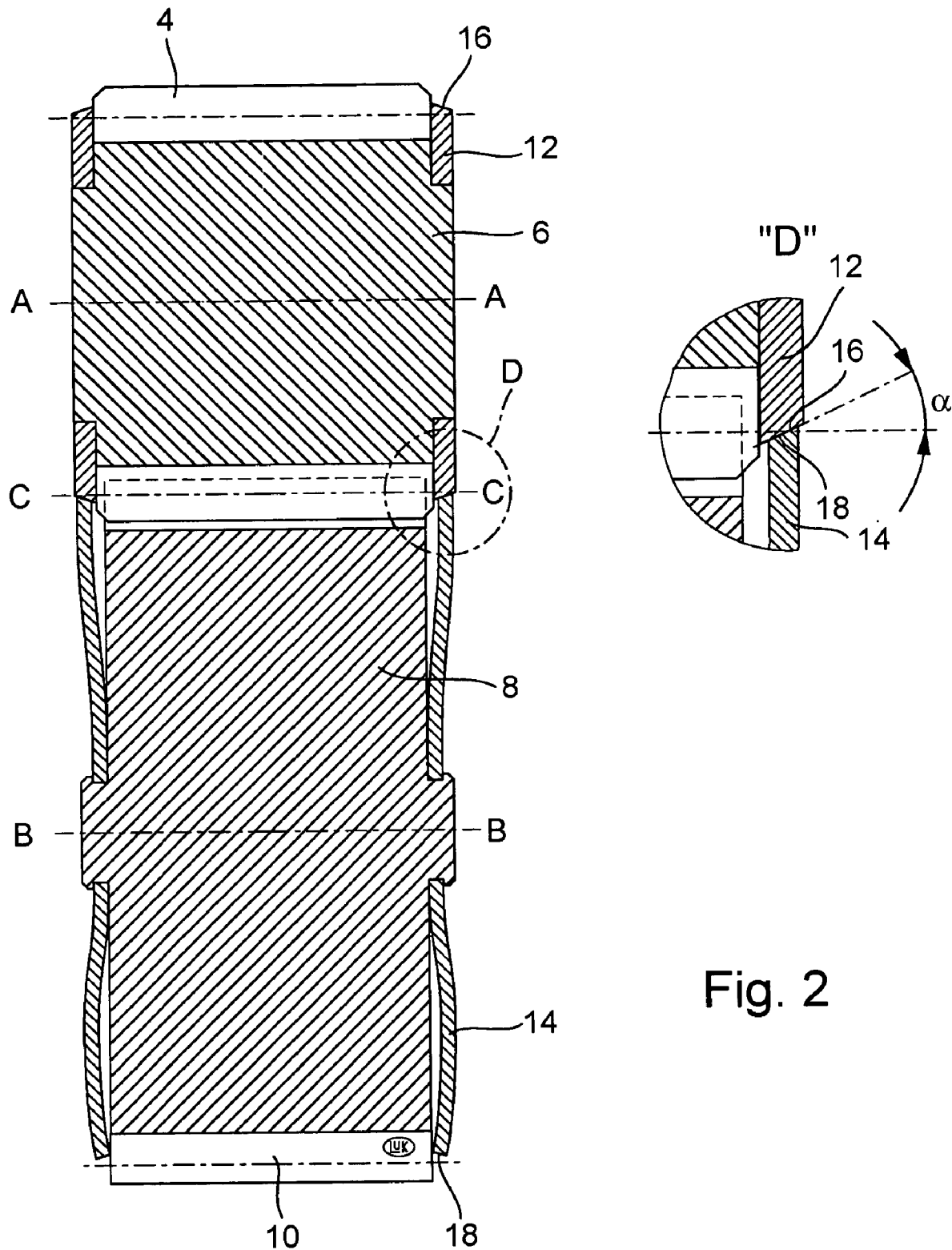
FIG. 2 represents a sectional view of a second embodiment of the gear mechanism according to the invention in a plane containing the gear axes.

In the embodiment of FIG. 1, the friction drive is used only on one side of the gears which, because of the conical configuration of the friction surfaces, introduces an axial stress load in the gear pair. This condition can be avoided by arranging the friction drive on both sides of the gears as shown in FIG. 2 which, in all other aspects, is identical with FIG. 1.

As is self-evident, the friction drive of the foregoing description can be modified in a multitude of ways. The pre-tension between the friction rim surfaces does not necessarily have to be generated by means of a dish-shaped spring but can also be produced in other ways. The friction wheels can be made of one piece together with the gears by machining the gears in an appropriate manner. The friction wheels do not necessarily have to be attached to the gears but can also be rotationally fixed on shafts that are, in turn, rotationally coupled to the gears.

What is claimed is:

1. A gear drive mechanism with an anti-rattle device, comprising:
   a first gear rotatable about a first axis,
   a second gear rotatable about a second axis, wherein the second gear meshes with the first gear, and the second axis is located at a predetermined distance from the first axis,
   a first friction disk having a first friction rim surface that is rotationally coupled to the first gear and has a first frusto-conical shape, and
   a second friction disk having a second friction rim surface that is rotationally coupled to the second gear and has a second frusto-conical shape,
   wherein the first friction rim surface and the second friction rim surface are in circumferential contact with each other and thereby enabled to transmit a friction-based torque between each other, wherein one of the first and second friction rim surfaces is elastically biased against the other friction rim surface.

2. The gear drive mechanism of claim 1, wherein at least one of the first and second friction disks comprises a friction wheel that is attached to one side of the respective one of the first and second gears.

3. The gear drive mechanism of claim 1, wherein the first and second frusto-conical shapes have respective first and second median radii, and wherein said first and second median radii are equal to respective pitch circle radii of the first and second gears.

4. The gear drive mechanism of claim 3, wherein said-frusto-conical shapes have cone angles of substantially 25°.

5. The gear drive mechanism of claim 3, wherein the friction rim surface that is biased against the other is elastically biased with a pre-tensioning force acting in a direction that causes an increased contact pressure between the first and second friction rim surfaces.

6. The gear drive mechanism of claim 5, wherein said pre-tensioning force is directed axially.

7. The gear drive mechanism of claim 6, wherein the biased one of said first and second friction rim surfaces is formed on an outer circumference of a dish-shaped spring disc.

8. The gear mechanism of claim 1, wherein the first and second discs are ring shaped disks that are coaxially arranged on, respectively, the first and second gears.

9. The gear mechanism of claim 1, wherein the first and second friction rim surfaces are hardened.

10. The gear mechanism of claim 1, wherein the first and second friction rim surfaces are provided with a coating.

11. The gear mechanism of claim 1, wherein the first friction rim surface comprises two first parts arranged, respectively, on opposite sides of the first gear, and wherein the second friction rim surface comprises two second parts arranged, respectively, on opposite sides of the second gear.

12. A gear drive mechanism with an anti-rattle device, comprising:
    a first gear rotatable about a first axis and having a first retaining feature,
    a second gear rotatable about a second axis, wherein the second gear meshes with the first gear, and the second axis is located at a predetermined distance from the first axis, the second gear having a second retaining feature,
    a first friction disk having a central opening and a first friction rim surface that is rotationally coupled to the first gear by receiving the first retaining feature in the central opening, the first friction disk having a first frusto-conical shape, and
    a second friction disk having a central opening and a second friction rim surface that is rotationally coupled to the second gear by receiving the second retaining feature in the central opening, the second friction disk having a second frusto-conical shape,
    wherein the first friction rim surface and the second friction rim surface are in circumferential contact with each other and thereby enabled to transmit a friction-based torque between each other, wherein one of the first and second friction rim surfaces forms an elastic interface with the other friction rim surface.

13. The gear drive mechanism of claim 12, wherein the first and second retaining features comprise protrusions that extend outwardly from the respective first and second gears and are received in the central openings of the first and second friction disks.

* * * * *

UNITED STATES PATENT AND TRADEMARK OFFICE
CERTIFICATE OF CORRECTION

| | |
|---|---|
| PATENT NO. | : 7,225,699 B2 |
| APPLICATION NO. | : 10/607076 |
| DATED | : June 5, 2007 |
| INVENTOR(S) | : Hans-Walter Wodtke |

It is certified that error appears in the above-identified patent and that said Letters Patent is hereby corrected as shown below:

In the Cover Page: item [30]

Please delete "June 27, 2002 (DE) 102 280 706" and insert --June 27, 2002 (DE) 102 28 706--

Signed and Sealed this

Thirty-first Day of July, 2007

JON W. DUDAS
*Director of the United States Patent and Trademark Office*